US00RE40949E

(19) United States
(12) Reissued Patent
Davis et al.

(10) Patent Number: US RE40,949 E
(45) Date of Reissued Patent: Nov. 3, 2009

(54) SERVER-SIDE RECYCLE BIN SYSTEM

(75) Inventors: Ray Charles Davis, Spring, TX (US); Bobby Ernest Blythe, Houston, TX (US)

(73) Assignee: SimDesk Technologies, Inc., Houston, TX (US)

(21) Appl. No.: 11/212,139

(22) Filed: Aug. 25, 2005

Related U.S. Patent Documents

Reissue of:
(64) Patent No.: 6,611,836
Issued: Aug. 26, 2003
Appl. No.: 09/749,116
Filed: Dec. 26, 2000

(51) Int. Cl.
*G06F 17/30* (2006.01)

(52) U.S. Cl. ..... 707/100
(58) Field of Classification Search ..... 707/2, 707/3, 100; 709/224
See application file for complete search history.

(56) References Cited

U.S. PATENT DOCUMENTS

| | | | |
|---|---|---|---|
| 5,625,818 | A | 4/1997 | Zarmer et al. |
| 5,727,203 | A | 3/1998 | Hapner et al. |
| 5,737,737 | A | 4/1998 | Hikidia et al. |
| 5,838,319 | A | 11/1998 | Guzak et al. |
| 5,905,492 | A | 5/1999 | Straub et al. |
| 5,977,971 | A | 11/1999 | Guzak et al. |
| 6,044,405 | A | 3/2000 | Driscol et al. |
| 6,091,411 | A | 7/2000 | Straub et al. |
| 6,108,651 | A | 8/2000 | Guha |
| 6,147,687 | A | 11/2000 | Wanderski |
| 6,345,318 | B1 | 2/2002 | Gamon |
| 6,366,988 | B1 | 4/2002 | Skiba et al. |
| 6,380,957 | B1 | 4/2002 | Banning |
| 6,411,685 | B1 | 6/2002 | O'Neal |
| 2002/0016750 | A1 | 2/2002 | Attia |
| 2002/0056031 | A1 | 5/2002 | Skiba |

FOREIGN PATENT DOCUMENTS

EP 0 735 473 A2 10/1996

OTHER PUBLICATIONS

Novell, Netware 3.12 System Administration Guide, Jul. 1993, pp. 275–277 (452 pgs.).
Novell, Netware 3.12 Utilities Reference, Jul. 1993, pp. 284–289 (436 pgs.).
Wedde et al., Real–Time File Performance of a Completely Decentralized Adaptive File System, IEEE, 1989, pp. 340–347.*
Wedde et al., Adaptive Real–Time File Handling in Local Area Networks, IEEE, pp. 1989.*

* cited by examiner

*Primary Examiner*—Etienne P Leroux
(74) *Attorney, Agent, or Firm*—Wong, Cabello, Lutsch, Rutherford & Brucculeri, LLP

(57) ABSTRACT

A server-side recycle bin system for retaining computer files and information is disclosed. The system comprises a local computer system, and a server including a server-side recycle bin. One or more persistent storage devices, providing the files and directories to be protected, are present either as part of the local computer system or as part of the server. The local computer system and the server may be connected via a wide area computer network, a local area network, the Internet, of any other method or combination of methods. A file manager application running on the local computer system interacts with a file serving application on the server such that there is generated a retained file in the server-side recycle bin.

35 Claims, 3 Drawing Sheets

SERVER-SIDE RECYCLE BIN SYSTEM

Matter enclosed in heavy brackets [ ] appears in the original patent but forms no part of this reissue specification; matter printed in italics indicates the additions made by reissue.

BACKGROUND OF THE INVENTION

In recent years, the computer files generated by many software applications have become larger and larger. This is especially the case for the computer files generated by applications that involve the storage and manipulation of photographs, motion pictures, and/or sound recordings. At the same time, whether because of the Internet, more complex operating systems, or otherwise, computers now tend to generate and store a much greater number of individual computer files. To save valuable storage space, and perhaps to reduce the appearance of unnecessary clutter, a user will often desire to delete computer files and/or directories from the user's hard disk drive or other assessable persistent storage devices. Unfortunately, oftentimes a user will delete these files or directories, only to find out later that the deleted data was desired or necessary. For example, a deleted file or directory may contain information that the user actually desired to retain, or the deleted file or directory, unbeknownst to the user, may have been necessary to the proper operation of one or more of the software applications used by the user.

One partial solution to this problem has been the use of a local "recycle bin" system. A "recycle bin" is an object that serves as a means of temporarily storing and protecting data that has been marked for deletion, but has not yet been removed from the computer system. Recycle bins typically reside on the hard disk drive of a user's local computer. In the case of the various Microsoft Windows® operating systems, a local recycle bin temporarily stores and protects data residing on the local computer's hard disk drive only. The Windows® operating systems do not protect the data residing on any of the other persistent storage devices that may be a part of the user's local computer system, such as the computer's floppy diskettes, tape drives, rewriteable compact disks (CDRW's) or other removable media, or non-volatile random access memory. Likewise, these operating systems do not protect a user's data when the local computer user wishes to delete files and directories located on a server, as when the local computer is networked to a server.

Under this conventional approach, the local recycle bin is represented as an object on the user's desktop. When the user drags a file or directory to the recycle bin, or "deletes" a file or directory via graphical user interface commands, the file or directory is "moved" to the recycle bin. The file or directory has not yet been deleted. It still takes up valuable space on the user's local computer hard disk drive. The user may view the contents of the local recycle bin. The user has the ability to restore a file or directory in the recycle bin, thus returning the "deleted" file or directory to its former location.

Only when the user decides to "empty" the local recycle bin are the contents of the recycle bin are deleted. That is, when the local recycle bin is emptied, the operating system reclaims the physical space formerly occupied by the contents of the recycle bin. At this point, a deleted file or directory may be recovered, if at all, only by the use of difficult-to-use third party disk utility applications, such as Norton Utilities®, and the like.

Thus, the computer user may have two options. The user may empty the recycle bin to reclaim the physical disk space occupied by the contents of the recycle bin, and thereby risk not ever being able to recover the recycle bin's contents. Alternatively, the user may preserve the data contained in the recycle bin by allowing the unemptied recycle bin to fill up. Under this alternative, the remaining space available on the user's hard disk drive continues to be depleted. Neither option may be satisfactory. Thus, there exists a need for a recycle bin system where the recycle bin does not physically reside or take up significant space on the user's local computer.

SUMMARY OF THE INVENTION

The recycle bin system of the present invention makes use of a recycle bin that resides on a server. The system includes at least one local computer system and at least one server. The local computer system and the server may be connected in a variety of ways, including via a local area network (LAN), a wide area network, the Internet, various wireless methods, or other methods or combinations of methods. There is also included at least one persistent storage device storing the files and directories to be protected. This persistent storage device may reside either within the local computer system or on the server. When a user deletes a file and/or directory, either from a persistent storage device located within the user's local computer system, or from persistent storage device located on the server, a file manager application running on the user's local computer system interacts with a file serving application running on the server, resulting in the generation of a retained file and/or directory in the server-side recycle bin.

DESCRIPTION OF ILLUSTRATIVE EMBODIMENTS

Figure 1:
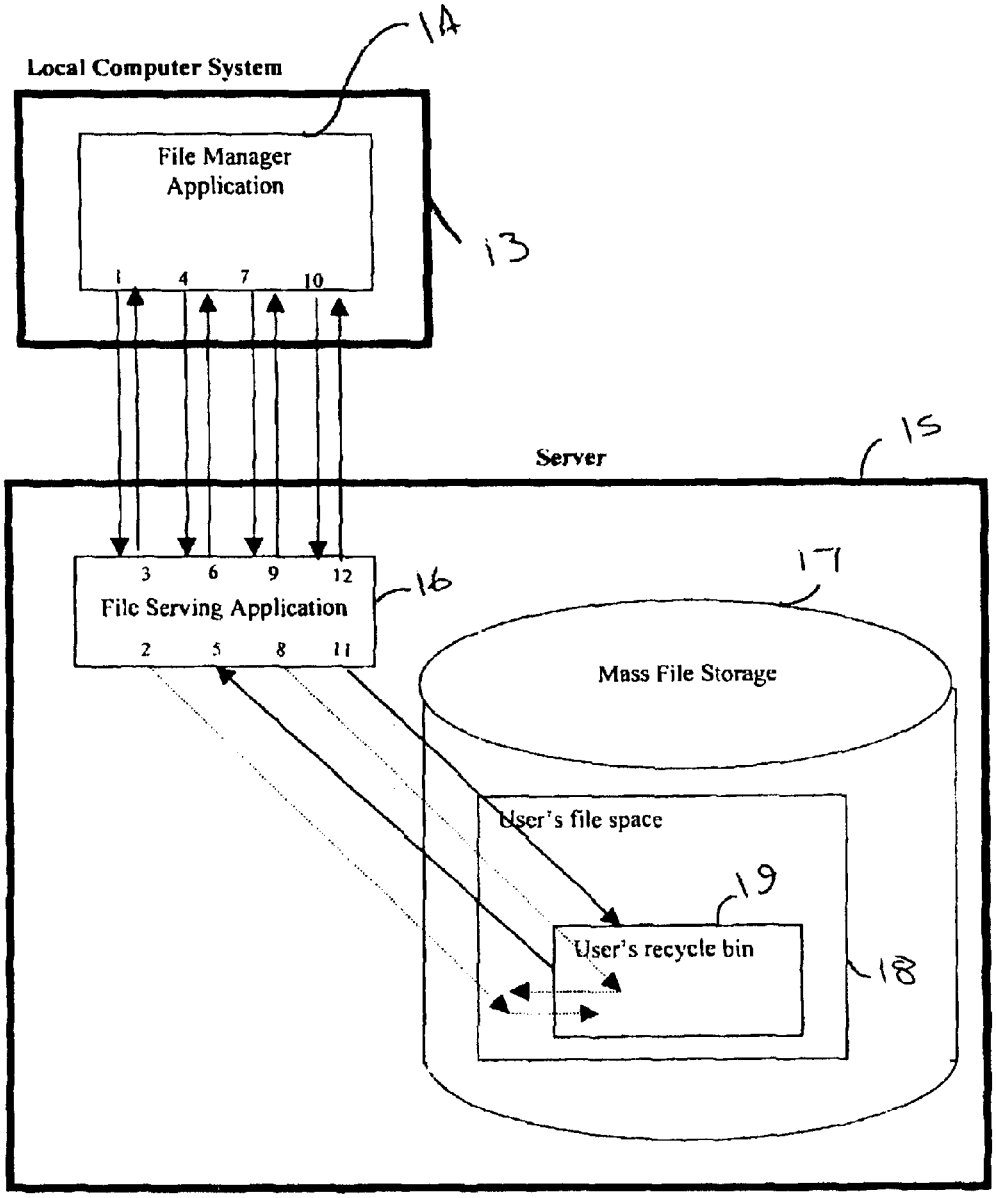
FIG. 1 is a diagram illustrating an exemplary communication scenario for one embodiment of the server-side recycle bin system of the present invention, wherein the protected files and directories reside within the server.

The server-side recycle bin system of the present invention comprises (1) a local computer system; (2) a server computer having a server-side recycle bin; (3) a persistent storage device, residing either within the local computer system or on the server, that provides files and directories to be protected; and (4) a file manager application running on the local computer that interacts with a file serving application running on the server such that there is generated a retained file and/or directory in the server-side recycle bin.

The local computer system and the server in the present invention may be connected via a local area network (LAN), a wide area network, the Internet, various wireless methods, or other methods. The connection between the local computer system and the server may make use of combinations of the above previously-mentioned methods, and the connection may take place over physical, wired connections or fiber-optic cables, or via various known wireless connection methods, or the like.

The local computer system of the present invention may include a Microsoft Windows®-based personal computer or other type of personal computer. Other suitable local computer systems include other types of computing devices, such as handheld computers, handheld mobile communication computers, and disk-driveless computers that rely upon a server for their storage or other functions. Still other suitable local computer systems include any of the various "web appliance" computers specifically designed to facilitate a user's access to the range of content available or soon to be available on the Internet.

The present invention includes at least one persistent storage device that stores the files and directories to be protected. The persistent storage device may physically reside within the local computer system, as in the case of a hard disk drive within or attached to a personal computer. Alternatively, the persistent storage device may reside within the server so long as it may be accessed from the local computer. It will be understood by those of ordinary skill in the art that a server may include a plurality of persistent storage devices and logical connections thereto. Suitable persistent storage devices include hard disk drives, floppy diskette drives, tape drives, rewriteable compact disks (CDRWs) or other removable media, non-volatile random access memory, or the like.

The present invention includes a file manager application running on the local computer. This local file manager application is a software program responsible for communicating various requests to the server. It will be understood that while the local file manager runs on the local computer, the application itself may be physically stored at any location accessible to the local computer, for example, on a hard disk drive within the local computer system or on the server.

The present invention also includes a file serving application running on the server computer. This server-side file serving application is a software program responsible for receiving various requests from the local computer, for generating a retained file and/or directory in the server-side recycle bin, and for the various other tasks associated with the server-side recycle bin. The file manager application and the file serving application may be coded using any suitable commonly-available programming languages, for example, Visual Basic, C, Delphi, or the like.

According to the present invention, when a user on a local computer wishes to delete one or more files or directories accessible to the user, the user inputs such a command through any of various methods. The user may issue this command, for example, by dragging the file or directory to be deleted to a special recycle bin icon displayed on the desktop of the local computer; by "right clicking" on the icon representing the file or directory to be deleted, followed by a selection of a "delete" option; or by other methods. Upon doing so, the local file manager application and server-side file serving application interact so as to effectively generate the file and/or directory within the server-side recycle bin.

The "deleted" file and/or directory thereafter no longer appears to the user to be within the file directory from which the user intended to delete it. In the case of a file or directory to be deleted from a persistent storage device physically residing within the local computer system, the user may have the option of disabling any local recycle bin system that may be present, as for example, in a Windows®-based operating system. If the local recycle bin system is disabled, then upon the deletion of the targeted file or directory, the physical space formerly occupied by the deleted file or directory becomes freed up for other use by the local computer.

As part of the interaction between the local file manager application and the server-side file serving application, there is generated a retained file having a unique name that may be different from the name of the deleted file or directory. Certain relevant information about the file or directory, such as its original name, size, location, file creation access and edit times and dates, etc., may also be retained.

In one aspect of the present invention, the local file manager application and server-side file serving application interact, upon an appropriate command from a user or other authority, to allow for the viewing of the contents of the server-side recycle bin. Other relevant information, such file or directory name, size, former location, deletion date, etc. of the recycle bin contents, may also be displayed.

In another aspect of the present invention, the local file manager application and server-side file serving application interact, upon an appropriate command from a user or other authority, to "restore" the deleted file or directory. The restored file or directory is thus placed back into its former location, or to another designated location. The relevant data in the server-side recycle bin may or may not be thereafter retained.

In still another aspect of the present invention, upon an appropriate command from the user or other authority, the local file manager application and server-side file serving application interact to "empty," or delete the contents in, the server-side recycle bin.

It will be appreciated that a directory is conceptually different from a file, in that a directory is basically a placeholder that contains information and data about the structure and relationships between files. Thus, when a user according to the present invention recycles a directory, the information and data that constitute that directory is retained in one or more files within the server-side recycle bin.

It will also be appreciated that the size of recycle bin may be limited in several ways. For example, the user or a system administrator may specify a finite size (or maximum number of bytes) for the user's server-side recycle bin. The size of the recycle bin may also be fixed as a percentage of the total space available.

Moreover, various recycle bin procedures may be implemented when the size of a file or directory to be recycled exceeds the space allocated to the server-side recycle bin. For example, the oldest pre-existing file or files in the recycle bin may be deleted to free up space in the recycle bin for a newly recycled file or directory. Alternatively, the ability of the user to delete files or directories may be suspended or curtailed. In any event, various indications that the recycle bin's storage capacity has been exceeded may be sent to the user or other authority.

One embodiment of the server-side recycle bin system of the present invention will now be described with greater particularity and with reference to FIG. 1. The server-side recycle bin system comprises a server (15) and local computer system (13). The local computer system may include a personal computer. Running on the local computer system (13) is a file manager application (14). Running on the server (15) is a file serving application (16). The server (15) also includes at least one persistent storage device (17). Contained within such persistent storage device (17) is a file space (18) accessible to the user's local computer system. Also contained within the persistent storage device (17) is the user's server-side recycle bin (19). Various other applications and files, located on the server, may also be made available to the local computer system.

The server and the local computer system are connected via the Internet. Communication between the applications may be performed using Transaction Control Protocol via the Internet Protocol (TCP/IP), or User Datagram Protocol via the Internet Protocol (UDP/IP). These protocols have been commonly used for communication across the Internet since the inception of the Internet.

When a user operating from the local computer wishes to delete, or recycle, a file or directory located within the user's file space (18), the user inputs any of several file/directory deletion commands available on the user interface of the local file manager application (14). The file manager application (14) thereafter notifies (1) the file serving application (16). In response, file serving application moves (2) the file or directory to be deleted from its original location within the user's file space (18) to the recycle bin space (19) and renames it to a unique name to prevent any potential name conflict with any of the files and/or directories preexisting within the recycle bin space. An entry is added to the index of the recycle bin, including the original location of the file and/or directory, as well as the time and date it was recycled. The size of the recycle bin is regulated at this point. If the addition of the file and/or directory to the recycle bin will cause the recycle bin to exceed its size limit, the files and/or directories which were recycled earlier are removed in the order in which they were recycled, until there is enough space for the new file and/or directory to be stored. If the file and/or directory is too large for the recycle bin, it will still be placed in the recycle bin, but all other content in the recycle bin will have been discarded first. The file serving application (16) responds (3) with a success or failure status for the recycle operation.

When a user operating from the local computer wishes to view the contents of the recycle bin, the user inputs an appropriate command, the local file manager application (14) requests (4) a listing of the content of the recycle bin (19). In response, the file serving application (16) reads (5) the recycle bin index and sends (6) the recycle bin index to the local file manager application (14), which interprets the data and presents it to the user.

Should the user wish to restore a deleted file and/or directory from the server-side recycle bin, the user inputs such a command and the file manager (14) sends a request (7) to the file serving application (16) to restore the file. The file serving application then moves (8) the file and/or directory from the recycle bin to its previous or other location and renames it to its original name. The file and/or directory is logically removed from the recycle bin index. The file serving application responds (9) with a status which indicates the success or failure of the operation.

A user wishing to empty the recycle bin specifies so by means of the user interface of the local file manager application. The file manager application (14) sends a request (10) to the file serving application, which discards (11) the files and/or directories contained in the recycle bin and clears the recycle bin index. The file serving application responds (12) to the request (10) with a status which indicates the success or failure of the operation.

Of course, it will be understood by one skilled in the art that the above-described embodiment may easily be modified when the local computer system (13) and the server (15) are connected via a local area network or similar network. In such an embodiment, the local file manager application (14) and file serving application (16) would communicate via any one of several well-known protocols, including TCP/IP, UDP/IP, Apple Talk, NetBEUI, DLC, IPX/SPX, or the like. Moreover, the above-described embodiment may also be easily modified when the local computer system (13) and the server (15) are connected via a wide area network or similar network. In such an embodiment, the local file manager application (14) and file serving application (16) would also communicate via any one of several well-known protocols, including ATM, Frame Relay, or the like.

Figure 2:
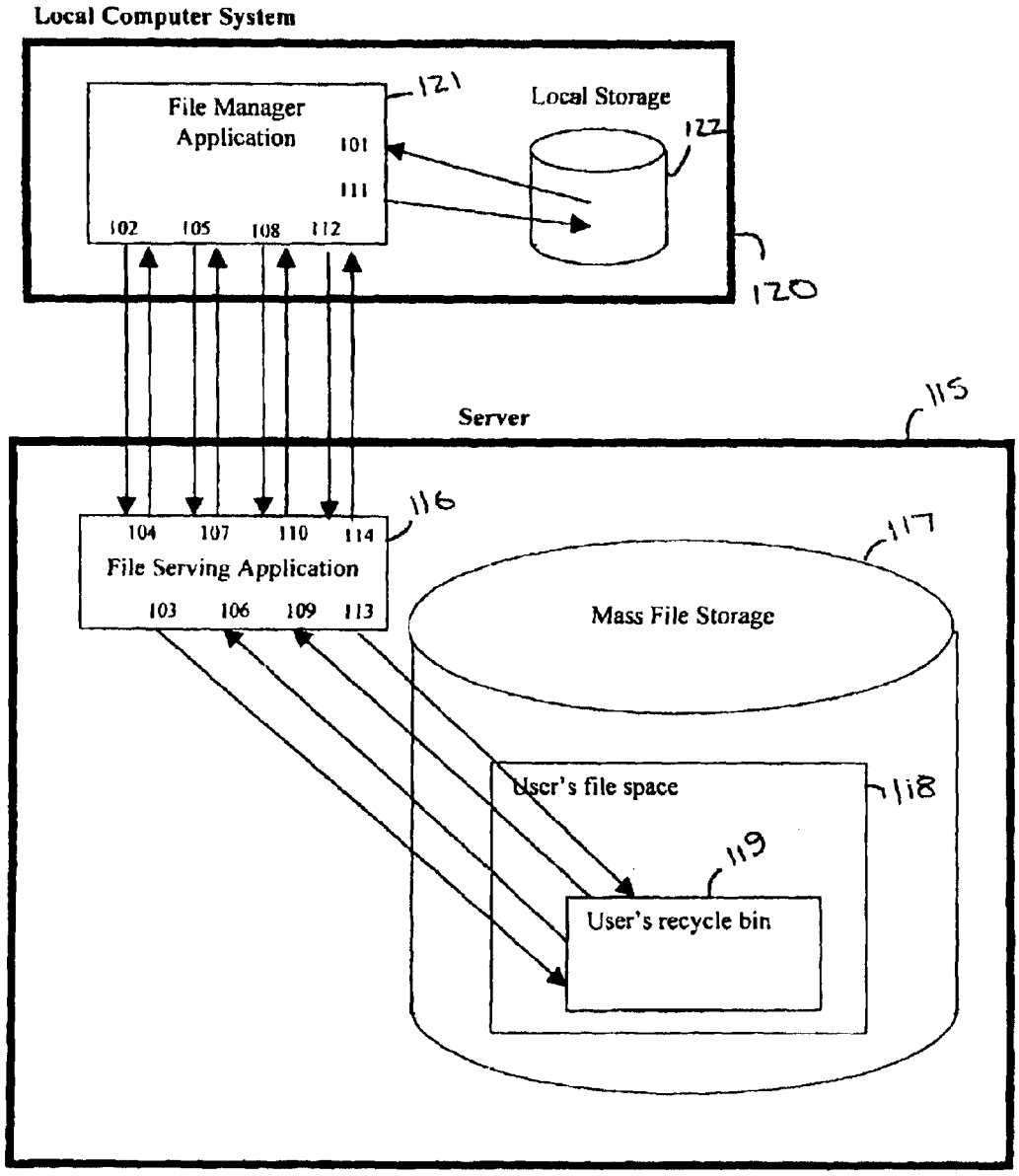
FIG. 2 is a diagram illustrating an exemplary communication scenario for another embodiment of the server-side recycle bin system of the present invention, wherein the protected files and directories physically reside within the local computer system.

Another embodiment of the server-side recycle bin system of the present invention will now be described with greater particularity and with reference to FIG. 2. The server-side recycle bin system comprises a server (115) and a local computer system (120). The local computer system may include a personal computer and any peripheral devices that may be attached thereto. Running on the local computer system (120) is a file manager application (121), and running on the server (115) is a file serving application (116). The server also includes at least one persistent storage device (117). Contained within the persistent storage device (117) is a file space (118) accessible to the user's local computer system. Also contained within the persistent storage device (117) is the user's server-side recycle bin (119). Once again, various other applications and files, located on the server, may also be made available to the local computer system. The local computer includes at least one persistent storage device (122). This local persistent storage device (122) may include such devices as a hard disk drive within or attached to a personal computer, or optionally a mass storage on a server (not shown) to which the user has access.

The server (115) and the local computer system (120) are once again connected via the Internet. Communication between the applications may be performed using TC/IP, UDP/IP, or other suitable protocols.

When a user operating from the local computer (120) wishes to delete a file or directory located within the user's local persistent storage device (122), the user inputs any of several deletion commands available on the user interface of the local file manager application (121). The file manager application reads (101) the file and/or directory from the local storage device, and sends it (102) to the file serving application (116), along with a request that the file and/or directory be placed in the user's recycle bin (119). The file serving application (116) writes (103) the transferred file into the recycle bin (119) and renames it to a unique name to prevent any potential name conflict with any of the files and/or directories preexisting within the recycle bin space. As with the first embodiment, an entry is added to the directory of the recycle bin, including the original location of the file and/or directory, as well as the time and date it was recycled. The size of the recycle bin is then regulated: If the addition of the file and/or directory to the recycle bin will cause the recycle bin to exceed its size limit, the files and/or directories which were recycled earlier are removed in the order in which they were recycled, until there is enough space for the new file and/or directory to be stored. If the file and/or directory is too large for the recycle bin, it will still be placed in the recycle bin, but all other content in the recycle bin will have been discarded first. The file serving application (116) responds (104) with a success or failure status for the recycle operation. When the local file manager application (121) receives a success status, the recycled file and/or directory is removed from the local persistent storage device (122), or alternatively, transferred to a preexisting local recycle bin (not shown) within the local persistent storage device (122), as for example, in standard Windows®-based operating systems.

When a user from the local computer wishes to view the contents of the server-side recycle bin (119), the user inputs an appropriate command, and the file manager application (121) requests (105) a listing of the content of the recycle bin (119). In response, the file serving application (116) reads (106) the recycle bin index and sends (107) the recycle bin index to the local file manager application (121), which interprets the data and presents it to the user.

Should the user wish to restore a deleted file and/or directory from the server-side recycle bin, the user inputs such a command, and the file manager (121) sends a request (108) to the file serving application (116) to restore the file. The file serving application (116) then reads (109) the specified file and/or directory from the recycle bin (119), and sends (110) it to the local file manager application (121), along with a request that the file and/or directory be placed in its previous or other location within the user's local persistent storage device (122) and be renamed it to its original name. Following this request, the file manager application (121) writes (111) the file and/or directory to this appropriate space. Optionally, the file serving application (116) logically removes the restored file and/or directory from the recycle bin (119), upon receipt of a status message from the file manager application indicating the success of the restoration operation (not shown in figure).

As in the previously-detailed embodiments, a user wishing to empty the recycle bin (119) specifies so by means of the user interface of the local file manager application (121). The file manager application (121) sends a request (112) to the file serving application (116), which discards (113) the files and/or directories contained in the recycle bin (119) and clears the recycle bin index. The file serving application responds (114) to the request (112) with a status which indicates the success or failure of the operation.

Figure 3:
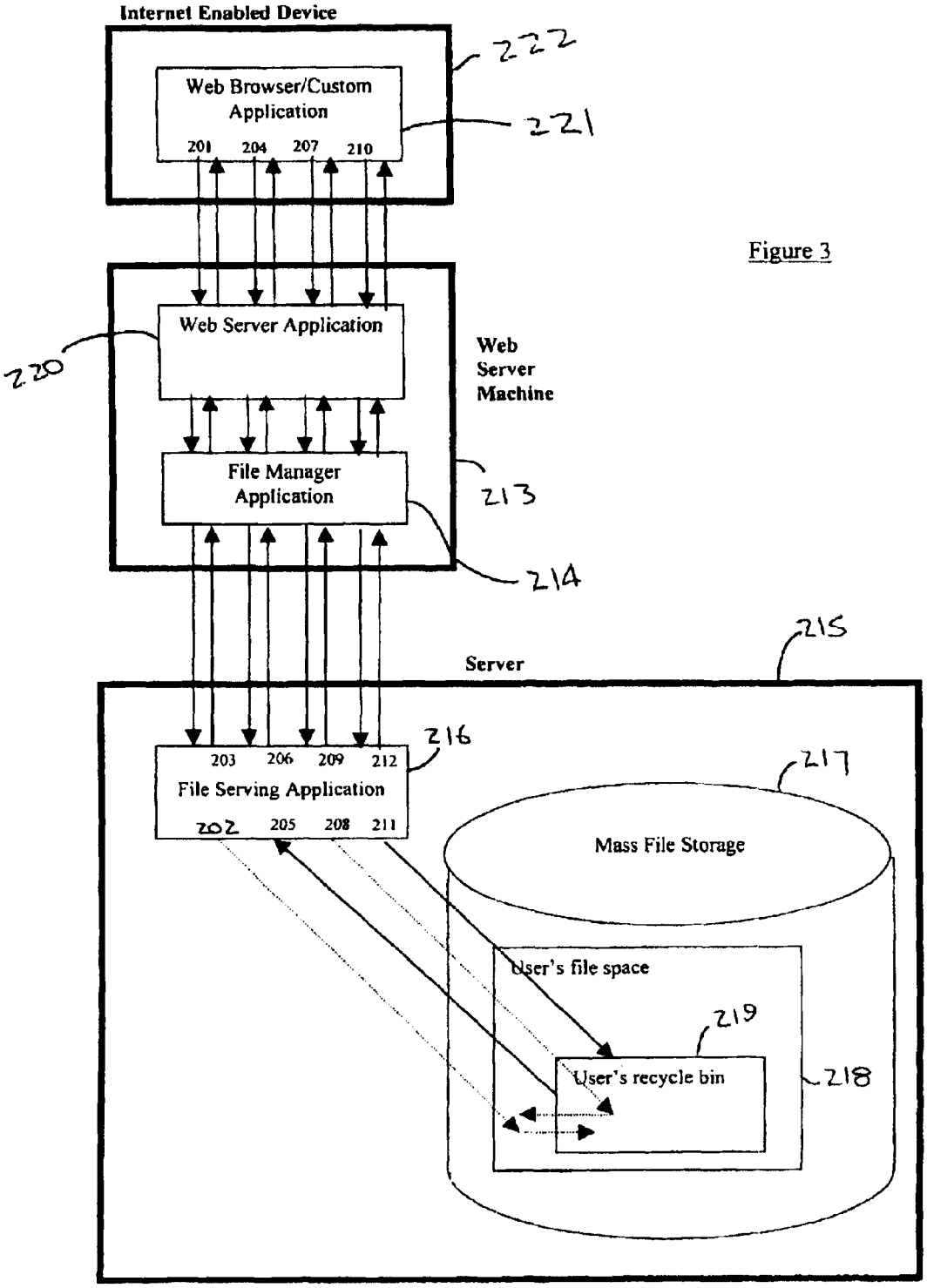
FIG. 3 is a diagram illustrating an exemplary communication scenario for one embodiment of the server-side recycle bin system of the present invention, wherein the protected files and directories reside within the server and the local computer system comprises a web enabled device and a web server machine.

Still another embodiment of the server-side recycle bin system of the present invention will now be described with greater particularity and with reference to FIG. 3. The server-side recycle bin system comprises a server (215) and local computer system. In this embodiment, the local computer system comprises a web server machine (213) and an Internet enabled device (222). The web server machine comprises a web server application (220) and a file manager application (214). The Internet enabled device (222) includes a user interface comprising a web browser or custom application (221). The Internet enabled device may comprise a personal computer, a thin-client computer, a handheld computer, such those made under the Palm® or other brand, or any other type of computer having access to the Internet. The Internet enabled device (222) and the web server machine are connected via the Internet and transfer information and data via a Hyper Text Transfer Protocol (HTTP), or other suitable protocol.

Running on the server (215) is a file serving application (216). The server (215) also includes at least one persistent storage device (217). Contained within such persistent storage device (217) is a file space (218) accessible to the user's local computer system. Also contained within the persistent storage device (217) is the user's server-side recycle bin (219). Various other applications and files, located on the server (215), may also be made available to the local computer system. The server (215) and the web serving machine (213) are connected via the Internet and communicate via TCP/IP, UDP/IP, or other suitable protocols.

A user operating from the Internet enabling device (222) initiates the deletion (recycling) of a file or directory residing in the user's file space (218) by inputting any one of several deletion commands available on the web browser or custom application (221). A message is sent (201) from web browser or custom application to the web server application (220), which relays it to the file manager application (214). The file manager application relays the message to the file serving application (216) running on the server (215). The file serving application responds by moving (202) the file or directory to be deleted from its original location within the user's file space (218) to the recycle bin space (219) and renaming it to a unique name. It also adds an entry to the directory of the recycle bin, including the original location of the file and/or directory and the time and date it was recycled, and it regulates the size of the recycle bin. Finally, the file serving application (216) responds (203) with the success or failure status for the recycle operation, this responds being relayed back to the web browser or custom application (221).

In a similar fashion, a user wishing to view the contents of the server-side recycle bin inputs an appropriate command to web browser or custom application (221), which sends a request (204) to the web server application (220). The web server application relays the request to the file manager application (214), which in turn relays the request to the file serving application (216) running on the server (215). The file serving application reads (205) the recycle bin index and sends (206) the index to the file manager application (214). The file manager application interprets the data and presents it to the user through the web server application (220) and web browser or custom application (221).

Restoration of a deleted file and/or directory from the server-side recycle bin is initiated by the user through an appropriate command on the web browser or custom application (221). A request (207) is relayed to the web application (220), which send the appropriate information to the file manager application (214). The file manager application relays the request to the file serving application (216). The file serving application then moves (208) the file and/or directory from the recycle bin to its previous or other location and renames it to its original name. The file and/or directory is logically removed from the recycle bin index, and the file serving application responds (209) to the file manager application (214) with a status which indicates the success or failure of the operation. This response is relayed to the web server application (220), which in turn relays it to the web browser or custom application (221).

The process of emptying recycle bin is initiated when the user so specifies so by means of the user interface on the Internet enabled device (222). This results in a request (210) being sent to the web server application (220), which relays it to the file manager application (214). The file manager application relays the request (210) to the file serving application (216), which discards (211) the files and/or directories contained in the recycle bin (219) and clears the recycle bin index. The file serving application then responds (212) to the request (210) with a status which indicates the success or failure of the operation. The response is relayed from the file manager application (214) to the web server application (220), which relays it to web browser or custom application (221) on the Internet enabled device (222).

Those skilled in the art will appreciate that still other embodiments are possible according to the present invention, and that the scope of the present invention is not limited to the specific embodiments disclosed herein.

References

The following references, to the extent that they provide exemplary procedural or other details supplementary to those set forth herein, are specifically incorporated herein by reference.

Not Applicable

Sequence Listing

Not Applicable.

What is claimed is:

1. A server-side recycle bin system for retaining computer files and information, comprising:

a) a local computer system *for use by a user*; and b) a server connected to the local computer system, the server comprising a persistent storage device;

the server further comprising a server-side *user* recycle bin located within the persistent storage device; and wherein a file manager application running on the local computer system and a file serving application running on the server interact to generate a retained file residing in the server-side *user* recycle bin.

2. The server-side recycle bin system of claim 1, wherein the file manager application and the *file* serving [manager] application interact to restore said retained file to a location on the persistent storage device but outside the *user* recycle bin.

3. The server-side recycle bin system of claim 2, wherein the file manager application and the *file* serving [manager] application interact to generate a *user* recycle bin index viewable from the local computer system.

4. The server-side recycle bin system of claim 2, wherein the file manager application and the *file* serving [manager] application interact to delete the contents stored in the *user* recycle bin.

5. The server-side recycle bin system of claim 2, wherein the local computer system and the server are connected via the Internet.

6. The server-side recycle bin system of claim 2, wherein the local computer system and the server are connected via a local area network.

7. The server-side recycle bin system of claim 2, wherein the local computer system and the server are connected via a wide area network.

8. The server-side recycle bin system of claim 5, wherein the local computer system comprises a personal computer.

9. The server-side recycle bin system of claim 5, wherein the local computer system comprises a handheld computer.

10. The server-side recycle bin system of claim 5, wherein the local computer system comprises an Internet enabled device.

11. A server-side recycle bin system for retaining computer files and information, comprising:

a) a local computer system comprising a persistent storage device; and b) a server connected to the local computer system, the server comprising a server-side recycle bin;

wherein a file manager application running on the local computer system and a file serving application running on the server interact to generate a retained file residing in the server-side recycle bin, *which retained file is a copy of a file, the file residing on the persistent storage device of the local computer and having been indicated for deletion.*

12. [The server-side recycle bin system of claim 11.] *A server-side recycle bin system for retaining computer files and information, comprising:*

*a) a local computer system comprising a persistent storage device; and*

*b) a server connected to the local computer system, the server comprising a server-side recycle bin;*

*wherein a file manager application running on the local computer system and a file serving application running on the server interact to generate a retained file residing in the server-side recycle bin, and* wherein the file manager application and the *file* serving [manager] application interact to restore said retained file to a location on the persistent storage device of the local computer system.

13. The server-side recycle bin system of claim 12, wherein the file manager application and the *file* serving [manager] application interact to generate a recycle bin index viewable from the local computer system.

14. The server-side recycle bin system of claim 12, wherein the file manager application and the *file* serving [manager] application interact to delete the contents stored in the recycle bin.

15. The server-side recycle bin system of claim 12, wherein the local computer system and the server are connected via the Internet.

16. The server-side recycle bin system of claim 15, wherein the local computer system comprises a personal computer.

[17. A server-side recycle bin system for retaining computer files and information, comprising:

a) a local computer system;

b) a server computer comprising at least one server-side recycle bin;

c) means for retaining deleted files and information; and d) a connection means for allowing communication between the local computer system and the server computer system.]

[18. The server-side recycle bin system of claim 17, further comprising means for restoring deleted files and information from the server-side recycle bin.]

[19. The server-side recycle bin system of claim 18, further comprising means for generating a recycle bin index viewable from the local computer system.]

[20. The server-side recycle bin system of claim 18, further comprising means for deleting the contents stored in the recycle bin.]

*21. The server-side recycle bin system of claim 11, wherein the file manager application and the file serving application interact to restore said retained file to a location on the persistent storage device of the local computer system.*

*22. The server-side recycle bin system of claim 11, wherein the file manager application and the file serving application interact to generate a recycle bin index viewable from the local computer system.*

*23. The server-side recycle bin system of claim 11, wherein the file manager application and the file serving application interact to delete the contents stored in the recycle bin.*

*24. The server-side recycle bin system of claim 11, wherein the local computer system and the server are connected via the Internet.*

*25. The server-side recycle bin system of claim 24, wherein the local computer system comprises a personal computer.*

*26. The server-side recycle bin system of claim 24, wherein the local computer system comprises a handheld computer.*

*27. The server-side recycle bin system of claim 24, wherein the local computer system comprises an Internet enabled device.*

*28. The server-side recycle bin system of claim 11, wherein the local computer system and the server are connected via a local area network.*

*29. The server-side recycle bin system of claim 11, wherein the local computer system and the server are connected via a wide area network.*

*30. A method for retaining computer files, comprising:*

*a) providing a local computer system for use by a user;*

*b) providing a server connected to the local computer system, the server comprising a persistent storage device, the server further comprising a server-side user recycle bin located within the persistent storage device; and*

*c) a file manager application running on the local computer system and a file serving application running on the server interacting to generate a retained file residing in the server-side user recycle bin.*

*31. The method of claim 30, wherein the file manager application and the file serving application further interact to restore said retained file to a location on the persistent storage device but outside the user recycle bin.*

*32. The method of claim 30, wherein the file manager application and the file serving application further interact to generate a user recycle bin index viewable from the local computer system.*

*33. The method of claim 30, wherein the file manager application and the file serving application further interact to delete the contents stored in the user recycle bin.*

*34. The method of claim 30, wherein the local computer system and the server are connected via the Internet.*

*35. The method of claim 34, wherein the local computer system comprises a personal computer.*

*36. The method of claim 34, wherein the local computer system comprises a handheld computer.*

*37. The method of claim 34, wherein the local computer system comprises an Internet enabled device.*

*38. The method of claim 30, wherein the local computer system and the server are connected via a local area network.*

*39. The method of claim 30, wherein the local computer system and the server are connected via a wide area network.*

* * * * *